US008682937B2

(12) United States Patent
Ludwig

(10) Patent No.: US 8,682,937 B2
(45) Date of Patent: Mar. 25, 2014

(54) ENERGY AND INTERNAL ENVIRONMENT MANAGEMENT INFORMATION SYSTEMS AND METHODS FOR BUILDINGS AND CAMPUSES

(75) Inventor: Lester F. Ludwig, Belmont, CA (US)

(73) Assignee: Lester F. Ludwig, San Antonio, TX (US)

( * ) Notice: Subject to any disclaimer, the term of this patent is extended or adjusted under 35 U.S.C. 154(b) by 7 days.

(21) Appl. No.: 13/103,104

(22) Filed: May 9, 2011

(65) Prior Publication Data

US 2011/0276533 A1 Nov. 10, 2011

Related U.S. Application Data

(60) Provisional application No. 61/332,758, filed on May 8, 2010.

(51) Int. Cl.
*G06F 17/30* (2006.01)
(52) U.S. Cl.
USPC ............................................. 707/802
(58) Field of Classification Search
USPC ............................................. 707/802
See application file for complete search history.

(56) References Cited

U.S. PATENT DOCUMENTS

| 5,816,491 | A | * | 10/1998 | Berkeley et al. | 236/46 R |
|---|---|---|---|---|---|
| 2004/0002776 | A1 | * | 1/2004 | Bickford | 700/30 |
| 2004/0176929 | A1 | * | 9/2004 | Joubert et al. | 702/184 |
| 2007/0219645 | A1 | * | 9/2007 | Thomas et al. | 700/29 |

* cited by examiner

*Primary Examiner* — Hung Q Pham
(74) *Attorney, Agent, or Firm* — Procopio, Cory, Hargreaves & Savitch LLP

(57) ABSTRACT

A building energy and environment information system for buildings and campuses. The invention provides an entirely elective and private incrementally deployed, incrementally modifiable, relatively inexpensive building information system that provides for a range of energy and environmental capabilities including room and building environment sensing (one or more of temperature, humidity, air quality, etc.), statistical processing software, modeling software, analysis software, information visualization software, decision support software, data logging, storage and recall, control arrangements, and interfacing with existing building systems (HVAC, solar, valves, power systems, etc.), external information systems and networks. The invention can be used for various purposes including trial deployment of equipment and software; exploratory or special-purpose information gathering; analysis, modeling, or simulation of current, past, or ongoing energy usage, loss, or waste as well as air temperature and quality distributions, impacts of changes to a building, facilities, policies, or operations; design of optimal control for building operation.

24 Claims, 13 Drawing Sheets

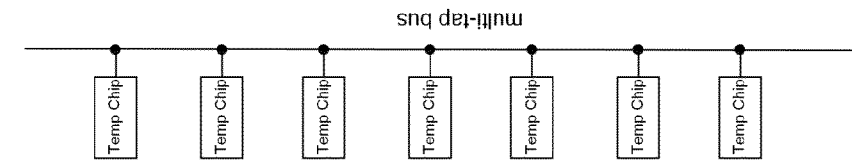
FIG. 3C
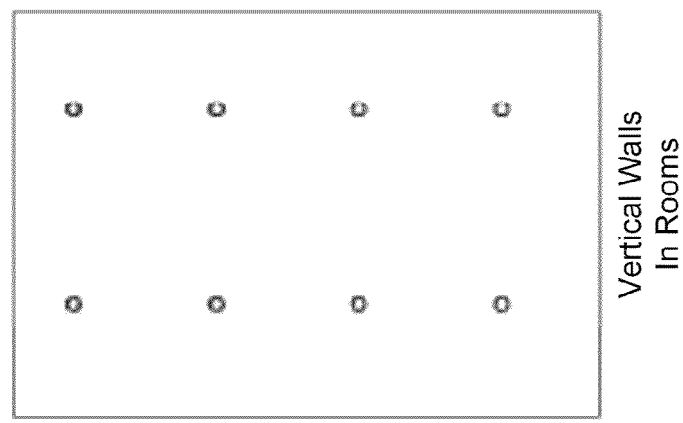
FIG. 3B
Vertical & Horizontal Air Temperature Gradients
FIG. 3A

- Visualizations of:
  - Line Data
  - Post data
  - Analysis Results  } Simple & Complex
- Optimal Control Suggestions
- MCDS Tool Suggestion
- Policy Research Tools
- Mock-up Operations GUI
- Actual Operations GUI
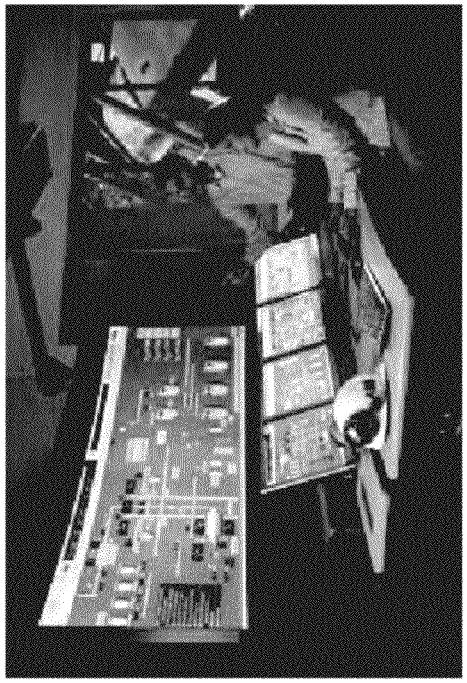
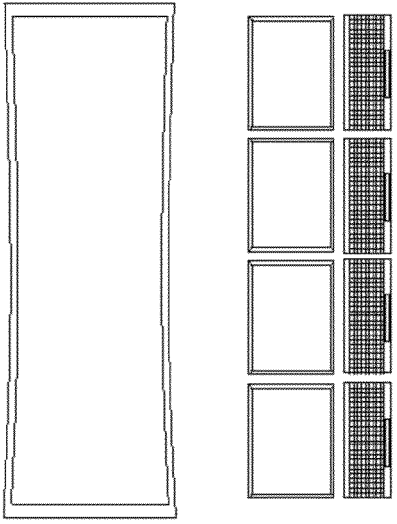
*FIG. 10*

- Simple Graphs
- Complex 3D
- Dense Information Representation
- Overlays of Multiple Data Sources
  - Line Data Visualization
  - Past Data Visualization
  - Models Visualization
  - Analysis Visualization

ENERGY AND INTERNAL ENVIRONMENT MANAGEMENT INFORMATION SYSTEMS AND METHODS FOR BUILDINGS AND CAMPUSES

CROSS-REFERENCE TO RELATED APPLICATIONS

Pursuant to 35 U.S.C. §119(e), this application claims benefit of priority from Provisional U.S. Patent application Ser. No. 61/332,758, filed May 8, 2010, the contents of which are incorporated by reference.

COPYRIGHT & TRADEMARK NOTICES

A portion of the disclosure of this patent document may contain material, which is subject to copyright protection. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

BACKGROUND OF THE INVENTION

The present invention pertains to energy management systems and building environment information systems for complex buildings and campuses, and more specifically to the room environment sensing systems, building environment sensing systems, and use of modeling, analysis, and visualization tools.

There has been increasing economic and environmental interest in "green buildings" and "green campuses." The "green" concept has come to mean many things and further is unfortunately increasingly becoming a marketing term, differentiating moniker, and political wedge concept used to provoke division. Independent of these, however, are the facts that reduction of energy use in buildings and the improvement of the air quality within the workplace and home have significant economic impacts.

New construction and "green" incentives provide an opportunity to introduce new indigenous technologies to improve energy use efficiency and occupant air quality. Some of these technologies, as well as adaptations of others of these technologies, can be applied to various degrees of introduction and use within existing buildings, particularly if carefully designed with such purposes in mind.

There are many categories of technologies for reduction of energy use in buildings and the improvement of the air quality within the workplace and home. Some of these technologies comprise innovations in building materials and/or construction techniques, layouts, etc. Others of these technologies comprise innovations in power distribution, air circulation, heating, cooling, and filtering. Yet others of these technologies comprise innovations in power generation, power management, energy harvesting, and energy storage/retrieval. Yet others of these technologies comprise innovations in the energy efficiency of systems such as motors, computers, individual electronic components and subsystems (integrated circuit chips, monitors, etc.). Yet others of these technologies comprise innovations in information systems for energy-use and building-environment monitoring. Still yet others of these technologies comprise innovations in control systems for various types of closed loop control. There are many other categories of such technologies as well, with new ones and ideas being created nearly continuously world-wide.

Among the many other categories of such technologies include integrated combinations of the above. For example, technologies for building-environment monitoring and control systems for closed loop control have long been combined in at least some form in HVAC systems. More sophisticated examples of integrated combinations are possible, of course, and this is an important aspect and utility provided by the present invention.

Some major developing economies (in particular China) have significant portions of their national GDP tied to green technology. In the US, many corporate forces resistant to change and their political defenders square off in conflict with corporate forces eager to at the very least embrace this rapid growth market and eventual need that will be, if nothing else, driven by the fact that high-populations in region such as Asia, South Asia, and later Africa will all be seeking quality-of-life and economic improvements that will otherwise demand simply unproducible expanding levels of energy use. The current standoff, whatever the merits, precludes many opportunities to develop leadership positions in these rapidly emerging industries. Thus, a technology approach that does not rely on a prevailing of one side over another in the present national economy provides a basis for developing leadership positions in these rapidly emerging industries. There are various ways this can be done, some of which are brought forward in other motivating contexts next.

A significant portion of the resistance to "green technologies" in general has to do with resistance to regulation and, to some extent, the provision of government subsidies. Thus, a technology approach that does not rely on regulation or government subsidies provides a basis for developing leadership positions in these rapidly emerging industries.

In the non-elective trial deployments of "smart meters" by utility companies there has been a wide range of reasons for resistance spanning concerns of surveillance, billing exploitation, risks of electromagnetic radiation, forced remotely-controlled power cuts, etc. Thus, a technology approach that does not rely on non-elective deployment or involvement with a utility company provides a basis for developing leadership positions in these rapidly emerging industries.

The present invention address the aforementioned forces and concerns with an entirely elective, entirely private, incrementally deployed, incrementally modifiable, relatively inexpensive building information system that provides for a range of energy and environmental capabilities including Room environment sensing arrangements,
Building environment sensing arrangements,
Statistical processing software,
Modeling software,
Analysis software,
Visualization software,
Data logging arrangements,
Data storage and recall arrangements,
Control arrangements,
Interfacing arrangements with existing building systems (HVAC, solar, valves, power systems, etc.).
Interfacing arrangements with external information systems and networks.

The invention provides for an open architecture facilitating the incremental introduction, expansion, conversion, replacement, and interfacing of the various component hardware and/or software systems and methods.

The invention can be used in various ways, either as dedicated to one or more specific purpose(s) or evolving incrementally through a sequence of developmental and/or application stages over a period of time. Example purposes and stages include:

Trial deployment of various sensors, networks, systems, and software
Early exploratory information gathering
Focused specific-purpose information gathering
Analysis of current, past, or ongoing energy usage
Analysis of current, past, or ongoing energy loss and/or waste
Analysis of building and facilities changes on energy usage, loss and/or waste
Analysis of policy and operating procedure changes on energy usage, loss and/or waste,
Analysis of current, past, or ongoing air temperature distributions,
Analysis of building and facilities changes on air temperature distributions,
Analysis of policy and operating procedure changes on air temperature distributions,
Analysis of current, past, or ongoing air quality (humidity, impurities, oxygen, carbon dioxide),
Analysis of building and facilities changes on air quality,
Analysis of policy and operating procedure changes on air quality,
Modeling of impacts of potential changes to building and facilities,
Modeling of impacts of potential changes to policy and operating procedure,
Simulation of impacts of potential changes to building and facilities.
Simulation of impacts of potential changes to policy and operating procedure changes,
Decision support for potential changes to building and facilities.
Decision support for potential changes to policy and operating procedure changes,
Design of optimal control policies for building air system operation,
Design of optimal control policies for building energy system operation.

SUMMARY OF THE INVENTION

For purposes of summarizing, certain aspects, advantages, and novel features are described herein. Not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The present invention comprises various forms building information systems for complex buildings and campuses that involve one or more of:
Room environment sensing arrangements,
Building environment sensing arrangements,
Modeling software,
Analysis software,
Visualization software,
Data logging arrangements,
Data storage and recall arrangements,
Control arrangements,
Interfacing arrangements with existing building systems (HVAC, solar, valves, power systems, etc.).
Interfacing arrangements with external information systems and networks.

In an implementation, the invention comprises an open architecture providing, for example, for incremental introduction, expansion, conversion, and replacement of room environment sensing arrangements.

In an implementation, the invention comprises an open architecture providing, for example, for incremental introduction, expansion, conversion, and replacement of building environment sensing arrangements.

In an implementation, the invention comprises an open architecture providing, for example, for incremental introduction, expansion, conversion, and replacement of modeling software.

In an implementation, the invention comprises an open architecture providing, for example, for incremental introduction, expansion, conversion, and replacement of analysis software.

In an implementation, the invention comprises an open architecture providing, for example, for incremental introduction, expansion, conversion, and replacement of visualization software, In an implementation, the invention comprises an open architecture providing, for example, for incremental introduction, expansion, conversion, and replacement of data logging arrangements, In an implementation, the invention comprises an open architecture providing, for example, for incremental introduction, expansion, conversion, and replacement of data storage and recall arrangements.

In an implementation, the invention comprises an open architecture providing, for example, for incremental introduction, expansion, conversion, and replacement of control arrangements In an implementation, the invention comprises an open architecture providing, for example, for incremental introduction, expansion, conversion, and replacement of interfacing arrangements with existing building systems (HVAC, solar, valves, power systems, etc.).

In an implementation, the invention comprises an open architecture providing, for example, for incremental introduction, expansion, conversion, and replacement of interfacing arrangements with external information systems and networks.

In an implementation, the invention can be used in various ways, either as dedicated to one or more specific purpose(s) or evolving incrementally through a sequence of developmental and/or application stages over a period of time.

In an implementation, the aforementioned purposes and stages can include one or more of:
Trial deployment of various sensors, networks, systems, and software
Early exploratory information gathering,
Focused specific-purpose information gathering,
Analysis of current, past, or ongoing energy usage,
Analysis of current, past, or ongoing energy loss and/or waste,
Analysis of building and facilities changes on energy usage, loss and/or waste,
Analysis of policy and operating procedure changes on energy usage, loss and/or waste,
Analysis of current, past, or ongoing air temperature distributions, Analysis of building and facilities changes on air temperature distributions, Analysis of policy and operating procedure changes on air temperature distributions, Analysis of current, past, or ongoing air quality (humidity, impurities, oxygen, carbon dioxide), Analysis of building and facilities changes on air quality, Analysis of policy and operating procedure changes on air quality, Modeling of impacts of potential changes to building and facilities, Modeling of impacts of potential changes to policy and operating procedure, Simulation of impacts of potential changes to building and facilities.

Simulation of impacts of potential changes to policy and operating procedure changes, Decision support for potential changes to building and facilities.

Decision support for potential changes to policy and operating procedure changes.

In an implementation, the invention provides a building information system and method, these comprising elements and steps relating to:

At least a first plurality of sensors distributed within the interior of a building;

At least a second plurality of sensors on the exterior of the building;

At least one network for transporting measurement data produced by at least by the first and second pluralities of sensors;

Data receiving software;

At least one statistical processing software system;

At least one analysis software system;

At least one software model;

At least one decision support software system;

At least one database; and

At least one information visualization system;

wherein measurement data produced by at least by the first and second pluralities of sensors are transported over the network to the data receiving software, wherein the data receiving software provides information to at least one of the statistical processing software system, the analysis software system, the software model, the decision support software system, and the database, and wherein at least one of the statistical processing software system, the analysis software system, the software model, the decision support software system, and the database provide information to the information visualization system.

In an implementation, the invention includes a simulation system.

In an implementation, the decision support software system is a multiple criterion decision support system.

In an implementation, at least one of the statistical processing software, the analysis software, the software model, the decision support software provides information to the database.

In an implementation, at least one of the statistical processing software, the analysis software, the software model, the decision support software is provided information from the database.

In an implementation, the information visualization system displays information from at least two of the statistical processing software, the analysis software, the software model, the decision support software.

In an implementation, the first plurality of sensors includes sensors for the measurement of electrical power usage in a room.

In an implementation, the first plurality of sensors includes sensors for the measurement of the temperature in at least one part of a room.

In an implementation, the second plurality of sensors includes sensors for the measurement of the heat flux flowing between the interior of the building and the environment outside of the building.

In an implementation, the second plurality of sensors includes sensors for the measurement of the temperature of at least one location on the exterior of the building.

BRIEF DESCRIPTION OF THE DRAWINGS

The above and other aspects, features and advantages of the present invention will become more apparent upon consideration of the following description of preferred embodiments taken in conjunction with the accompanying drawing figures.

FIGS. 3a-3c depict exemplary air temperature sensor arrangement as provided for by the invention.

FIG. 8a depicts a cross-section view of a part of wall that is comprised of outside wall, inside wall, and insulation layer in between wherein one or more temperature sensors are placed in the gap between the insulation layer and inside wall.

FIG. 8b depicts an exemplary multi-tap electrical bus arrangement for connecting a plurality of temperature sensors in an arrangement such as that depicted in FIG. 8a.

FIG. 10 depicts an exemplary display and operations console as provided for by the invention.

DETAILED DESCRIPTION

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In the following description, reference is made to the accompanying drawing figures which form a part, hereof, and which show by way of illustration specific embodiments of the invention. It is to be understood by those of ordinary skill in this technological field that other embodiments may be utilized, and structural, electrical, as well as procedural changes may be made without departing from the scope of the present invention.

Those of ordinary skill in this technological field will understand that other embodiments may be utilized, and structural, electrical, as well as procedural changes may be made without departing from the scope of the present invention. Wherever possible, the same reference numbers will be used throughout the drawings to refer to the same or similar parts.

The present invention provides and/or utilizes energy usage data, internal environment monitoring data, building energy monitoring data, and in some embodiments, external environment monitoring data.

Energy Monitoring

Energy usage monitoring data relevant to the invention can comprise live measurements comprising at least one or more of:

Electrical usage at electrical outlets,
Electrical usage from lighting,
Heating/cooling energy usage.

Building energy monitoring data relevant to the invention can comprise live measurements comprising at least one or more of:

HVAC power use,
Overall electrical power use,
Natural gas usage,
Building internal or accessible local stores of energy, fuel, etc.

Internal Environment Monitoring

Internal environment monitoring data relevant to the invention can comprise live measurements comprising at least one or more of:

Room temperature gradients at walls,
Other air measurements: air humidity, composition, particulates,
Wall/insulation temperature,
Heat flux in/out of building.

External Environment Monitoring

Figure 1:
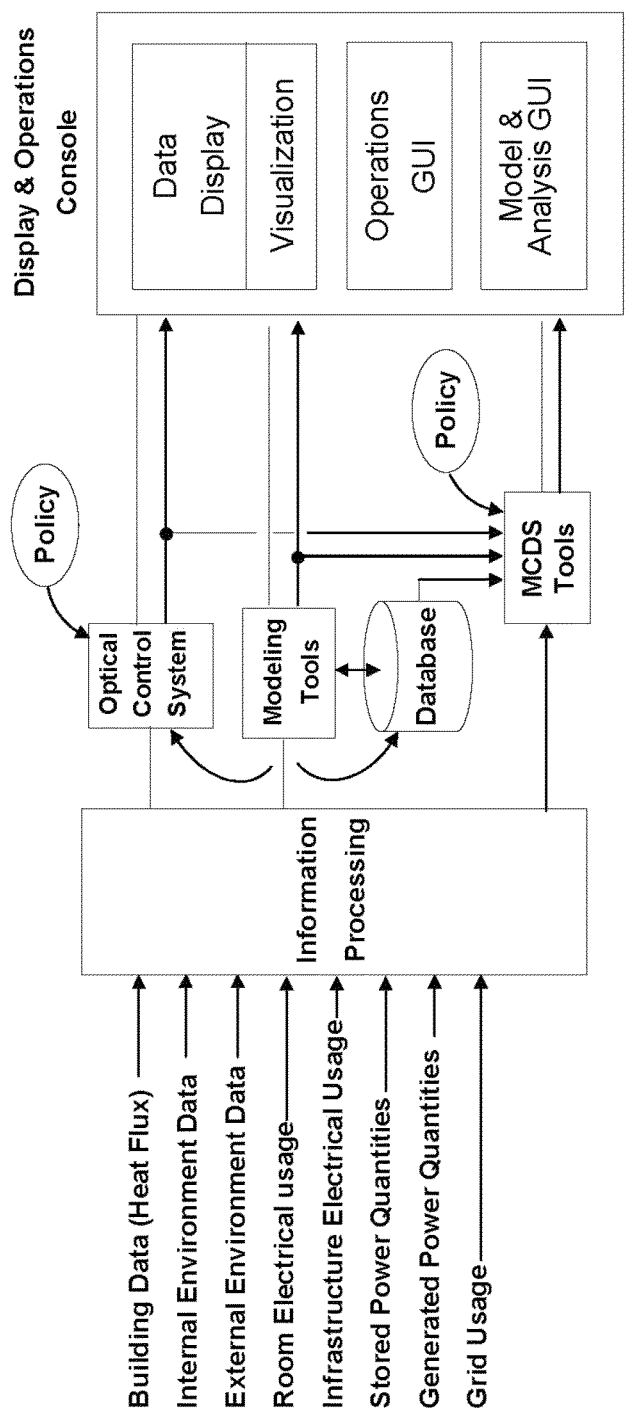
FIG. 1 depicts an exemplary information system as provided for by the invention.

External environment monitoring data relevant to the invention can comprise live measurements comprising at least one or more of:

Outside ambient air temperature
Outside wall/window temperature
Outside wind data, humidity data Information System, Data Handling, and Data Processing For the aforedescribed data, and in some embodiments other data, the present invention provides an information system comprising one of more of data analysis, modeling, simulation, information display, information visualization, decision-support, and policy research tools. FIG. 1 depicts an example information system embodiment as provided for by the invention. Such an example information system embodiment can, for example, comprise:

Data receiving software,
Statistical processing,
Data storage and retrieval,
Modeling,
Simulation,
Analysis,
Decision support
Information display:
   Real-time measurement data,
   Statistically processed data and/or information,
   Retrieved historical data and/or information,
   Results of variable-policy control systems,
   Results of variable-policy multi-criteria decision support systems.

In an embodiment, the functionality of an information system as provided for by the invention provides one or more of:

Statistical processing,
Information presentation,
Modeling,
Analysis,
Simulation,
Visualization of energy usage information and/or indoor environment information. Alternatively, or in addition, the functionality of an information system as provided for by the invention provides one or more of building, facilities, and/or policy analysis including:

Real-time monitoring,
Data set storage, search, and retrieval,
Data analysis,
Modeling/simulation,
Analysis,
Optimal control prototyping,
Multi-criteria decision support,
Information visualization.

Real-Time Sensing and Gathering of Measurement Data

The invention provides for the gathering real-time measurement data of various types of building internal from various building internal sources. The various types of building internal measurement data can include:

Rooms and open areas within buildings:
   Air temperature sensors (sparse arrays on wall and pillars),
   Air flow from vents,
   Lighting power use,
   Outlet power use.
Building itself:
   HVAC power use,
   Outside ambient air temperature,
   Outside wall/window temperature,
   Wall/insulation temperature,
   Outside wind data, humidity data.

In an embodiment, the invention gathers information from more than one building. In an embodiment, the invention gathers measurement data from a campus comprising a plurality of buildings. In an embodiment, the invention gathers measurement data from a plurality of campuses, each campus comprising a plurality of buildings.

Room Electrical Usage Measurement

In an embodiment, the invention gathers room electrical usage measurement data and provides it to the information system. This room electrical usage measurement data can comprise:

Lighting power use,
Outlet power use.

Figure 2:
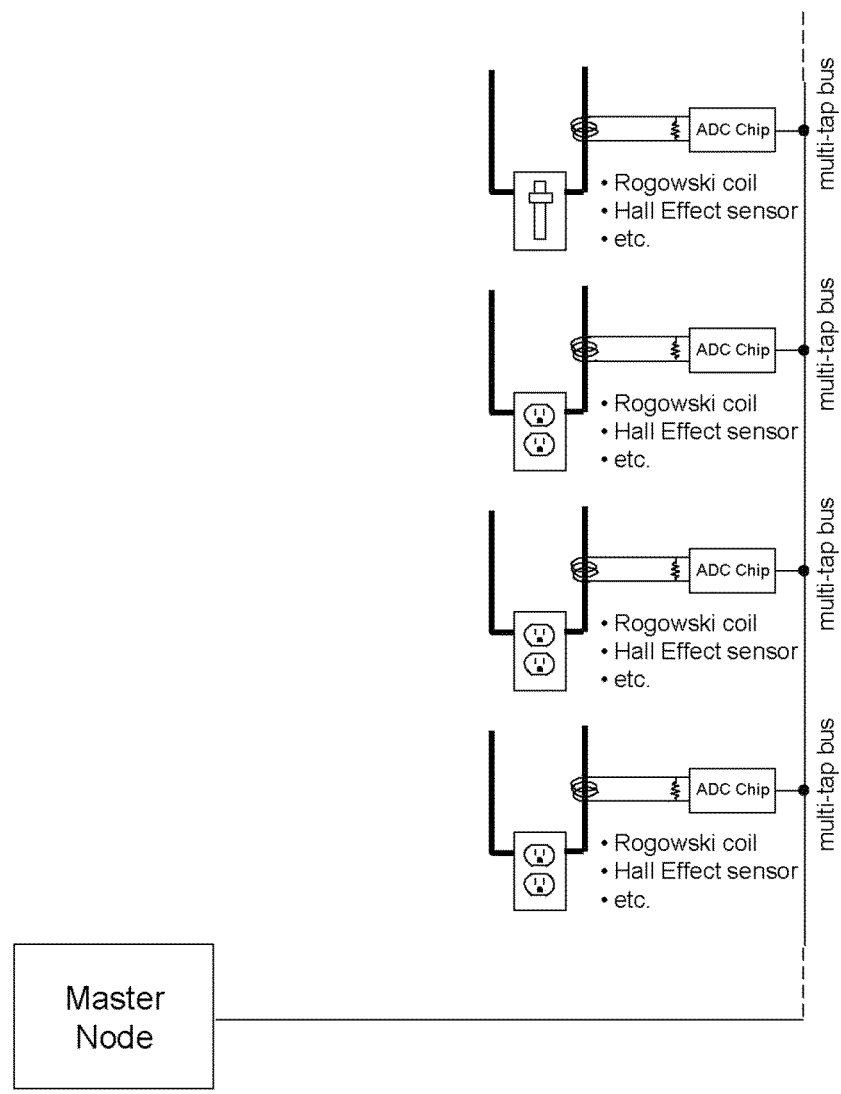
FIG. 2 depicts an exemplary approach to room electrical usage measurement as provided for by the invention employing a plurality of exemplary magnetic filed current sensors and an exemplary multi-tap electrical bus.

FIG. 2 depicts an exemplary approach to room electrical usage measurement as provided for by the invention employing a plurality of exemplary magnetic filed current sensors and an exemplary multi-tap electrical bus. In an embodiment, monitoring of local current (for example, positioned around an "AC hotwire") in room electrical boxes is employed. The monitoring can be implemented in many ways as is known to one skilled in the art, for example:

Rogowski coil (see for example http://en.wikipedia.org/wiki/Rogowski coil or better reference) AC current sensor, Hall effect current sensor (various products), Other types of coil arrangements.

Each of these produce analog voltages which can be turned to a digital value by an ADC (analog-to-digital converter) chip. Further, such ADC chips are available with electrical bus interfaces compatible with multi-tap electrical bus architectures. Three examples of multi-tap electrical bus architectures with a wide range of commercially available chip-level products are I$^2$C bus, SPI, and the (Dallas) "1-wire" bus, although the invention is not limited to these. In these and other multi-tap electrical bus architectures, one node, typically comprising an embedded controller or microprocessor, is designated a "master node" which typically is arranged to orchestrate communications on the bus and provides timing/clock information. Other considerations, such as distributions of pull-up resistors, wire length, terminations at either end of the bus, limitations on fan-out topologies, etc. that are well-known to those skilled in the art and which can be incorporated into embodiments of the invention.

These ADC chips with such bus interfaces can be set with a unique bus addresses so that each ADC can be uniquely accessed. Many ADC chips provide multiple analog input channels, allowing for interfacing to multiple sensors. This can be advantageous in some room AC wiring situations. In other room AC wiring situations, an ADC chip provided for each current sensor can turns out to be an advantageous architecture. Using approaches such as these, in an embodiment, the invention provides for a plurality of current sensors to interface to a multi-tap electrical bus.

In an embodiment, the invention provides for the plurality of current sensors to be powered by the same multi-tap electrical bus without the use of additional powering wires. It is possible to power the ADC chips from the bias or full-wave rectified versions of electrical signals on the bus. In such situations, it is possible for the master node or one or more power injection nodes (typically a power-supply with pull-up resistors) to supply power to bus so as to permit a plurality of chips and/or circuits on the bus to "self-power" by harvesting electrical power from the electrical signals on the bus.

Some ADC chips include chip-internal powering derived from the electrical signals on the bus. Other ADC chips that do not include chip-internal powering derived from the electrical signals on the bus can be outfitted with external circuitry and/or other provisions to power the ADC chip from the electrical signals on the bus. The coil current sensors are passive devices that do not require powering, so in the room electrical usage measurement arrangements described above employing those only the ADC requires powering. In contrast, Hall effect sensors are active devices that require powering. As with the ADC chips, it is possible to power a Hall effect sensor from the electrical signals on the multi-tap electrical bus employing similar or identical means.

FIG. 2, in more detail, depicts an exemplary arrangement wherein AC current measurements for at least one lighting switch and at least one outlet are configured to interface with a multi-tap electrical bus. The arrangement depicted in FIG. 2 can be further configured so as to power the measurement circuitry by the same multi-tap electrical bus. In an embodiment, the multi-tap electrical bus can be of the same type as that used in one or more of the other types of measurements.

In an embodiment, the multi-tap electrical bus can be the same instance as that used in one or more of the other types of measurements.

In an embodiment, the current sensors, electronics, and multi-tap electrical bus wiring are configured in electrically insulating packaging arrangements so that they are significantly electrically insulated and electrically isolated from accidental short circuits or other contact with dangerous AC currents. In an embodiment, the current sensors, electronics, and multi-tap electrical bus wiring are configured in shielded packaging arrangements so that they are significantly electromagnetically isolated from RFI and other electromagnetic interference created by the measured currents and/or other AC wiring.

In an embodiment, the aforedescribed multi-tap electrical bus can be replaced by a multiple-access wireless network and/or cabled Ethernet™.

Room Air Temperature Measurement

In an embodiment the invention provides for air temperature measurements to be made in a room so as to provide measurement data to the information system. In an embodiment, the invention comprises a plurality of air temperature sensors configured in sparse arrays on walls, pillars, and/or other structures. FIGS. 3a-3c depict exemplary air temperature sensors arrangements as provided for by the invention. FIG. 3a depicts an exemplary array of temperature sensors distributed on a room wall. FIG. 3b depicts an exemplary array of temperature sensors distributed on a supporting pillar, beam, or other structure (including artistic structures) in a room or open building interior area. The exemplary arrangements depicted provide for measurements of air temperature at various vertical and horizontal locations. In some embodiments, some of the spatial sensing capability is not provided. In some embodiments, other sensor location arrangements, for example on furniture, ceilings, on appendages, nettings, etc., attached to ceilings and/or walls, etc. can be employed to provide locations for temperature sensors.

In an embodiment, spatially distributed air temperature sensors, such as in the aforedescribed arrangements, can be connected to a multi-tap electrical bus in a similar manner as was described above in regards to room electrical usage measurements. It is noted that temperature sensor chips are commercially available which interface to tapped electrical bus architectures such as I$^2$C bus, SPI, and the (Dallas) "1-wire" bus, although the invention is not limited to these. These temperature sensor chips can be set with a unique bus addresses so that each temperature sensor chip can be uniquely accessed. It is also noted that some ADC chips which interface to tapped electrical bus architectures additional include a temperature sensors—in some embodiments this can be advantageously utilized. Further, similar arrangements can be made for powering temperature sensors and any associated electrical circuitry from electrical signals on the tapped electrical bus.

FIG. 3c depicts an exemplary arrangement wherein room air temperature measurements are configured to interface with a multi-tap electrical bus. The arrangement depicted in FIG. 3c can be further configured so as to power the measurement circuitry by the same multi-tap electrical bus. In an embodiment, the multi-tap electrical bus can be of the same type as that used in one or more of the other types of measurements. In an embodiment, the multi-tap electrical bus can be the same instance as that used in one or more of the other types of measurements.

In an embodiment, the aforedescribed multi-tap electrical bus can be replaced by a multiple-access wireless network and/or cabled Ethernet™.

The invention also provides for other means of temperature sensing, for example infrared imaging technologies.

Air Flow Measurement

In an embodiment the invention provides for air flow measurements to be made in a room so as to provide measurement data to the information system. In an embodiment, such an air flow measurement can be made by employing an air flow sensor in the area inside or just outside an air vent. In an embodiment, an air flow sensor can comprise a pivoting vane whose position is changed by the volume of air flow impounding force overcoming the force of gravity. In an embodiment, an air flow sensor can comprise an anemometer. The invention also provides for other types of air flow sensors to be used.

In an embodiment the invention provides for air temperature measurements of air flow so as to provide measurement data to the information system. In an embodiment, such an air temperature measurement can be made by employing an air temperature sensor in the area inside or just outside an air vent. Air temperature sensors can be implemented and networked in various ways, for example as described in the preceding section. In an embodiment, the multi-tap electrical bus can be of the same type as that used in one or more of the other types of measurements. In an embodiment, the multi-tap electrical bus can be the same instance as that used in one or more of the other types of measurements.

Figure 4A:
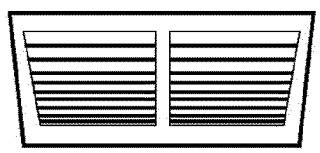
FIG. 4a depicts an exemplary passive vent.
Figure 4B:
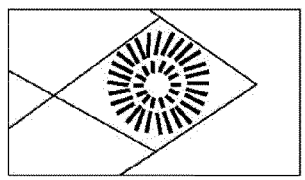
FIG. 4b depicts an exemplary remote-controlled vent.
Figure 4C:
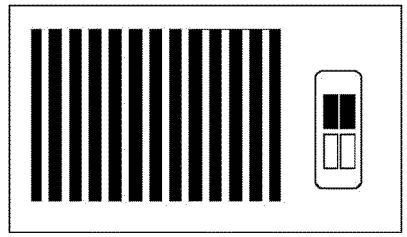
FIG. 4c depicts an exemplary intelligent vent.

The invention anticipates that a room can be provided with one or more airvents, and that these air vents can be of a variety of types. For example, FIG. 4a depicts an exemplary passive air vent, while FIG. 4b depicts an exemplary remote-controlled air vent. The remote control feature can be controlled directly by the present invention, indirectly by the present invention, by the building HVAC system, etc. FIG. 4c depicts an exemplary intelligent vent which, for example, can be activated by a motion detector, heat sensor, temperature sensor, etc., local to the vent.

Figure 4D:
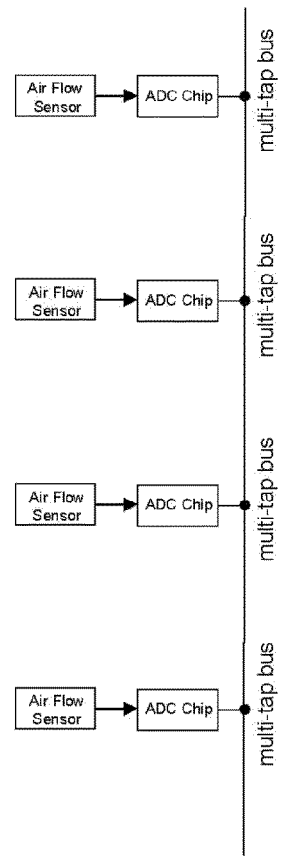
FIG. 4d depicts an exemplary arrangement of how a series of pairs of air flow sensors and ADC chips are connected to an electrical bus as provided for by the invention.

FIG. 4d depicts an exemplary arrangement of how a series of pairs of air flow sensors and ADC chips are connected to a multi-tap electrical bus as provided for by the invention. In an embodiment, the multi-tap electrical bus can be of the same type as that used in one or more of the other types of measurements. In an embodiment, the multi-tap electrical bus can be the same instance as that used in one or more of the other types of measurements.

In an embodiment, the aforedescribed multi-tap electrical bus can be replaced by a multiple-access wireless network and/or cabled Ethernet™.

Air Quality Monitoring

In a similar fashion, the invention provides for the use and measurement information networking of air quality sensors and systems. These can include:
Humidity measurement sensors,
Oxygen measurement sensors,
Carbon dioxide measurement sensors,
Pollen, dust, and/or particulate measurement sensors
Measurement sensors for other or specific types of chemicals and/or impurities.

More Complex Networking Arrangements

The invention provides for combining the various multi-tap electrical bus arrangements described earlier in various combinations. For example, FIG. 5 depicts an exemplary integrated room measurement bus to which various types of sensors and ADC chips are connected as provided for by the invention.

The invention provides for the various multi-tap electrical bus arrangements described earlier to be extended to span a plurality of rooms and/or other areas. For example, FIG. 6 depicts an exemplary inter-room wiring where an electrical bus is placed in the walls as provided for by the invention.

Figure 5:
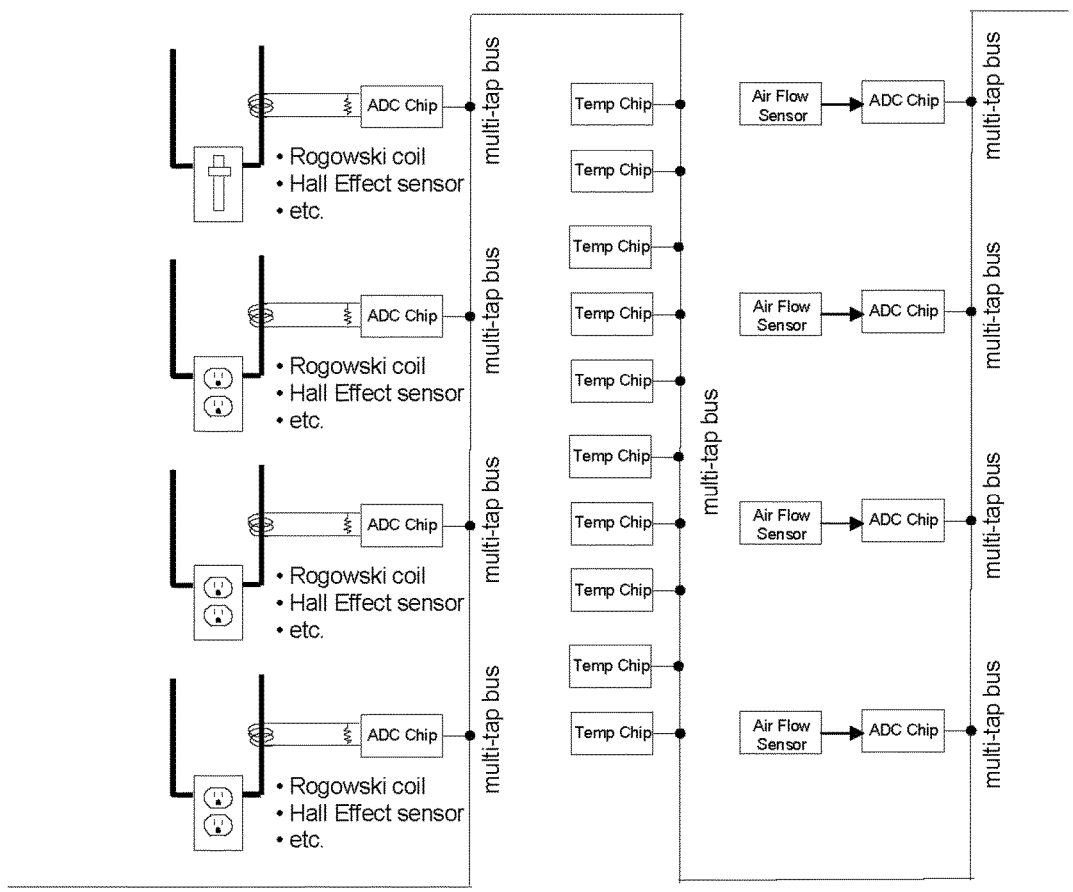
FIG. 5 depicts an exemplary integrated room measurement bus to which various types of sensors and ADC chips are connected as provided for by the invention.
Figure 6:
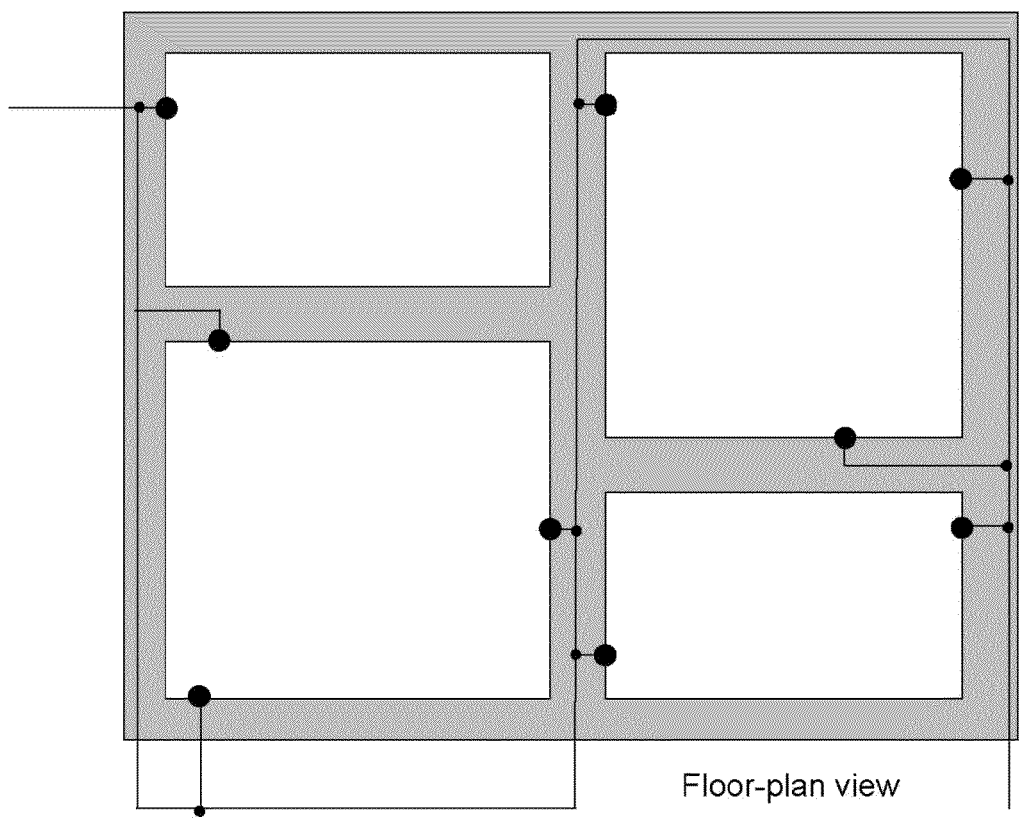
FIG. 6 depicts an exemplary inter-room wiring where an electrical bus is placed in the walls as provided for by the invention.

It is noted that the Dallas "1-Wire" bus does not provide the higher data rates of the $I^2C$ and SPI buses, but the "1-Wire" is relatively inexpensive, uses one fewer wire, and has longer range, all of which makes it ideal for use in extended reach configurations such as that depicted in FIGS. 5 and 6.

In an embodiment, the aforedescribed multi-tap electrical bus can be replaced and/or supplemented by one or more multiple-access wireless network(s).

Building Wall Sensor Arrangements

Figure 7:
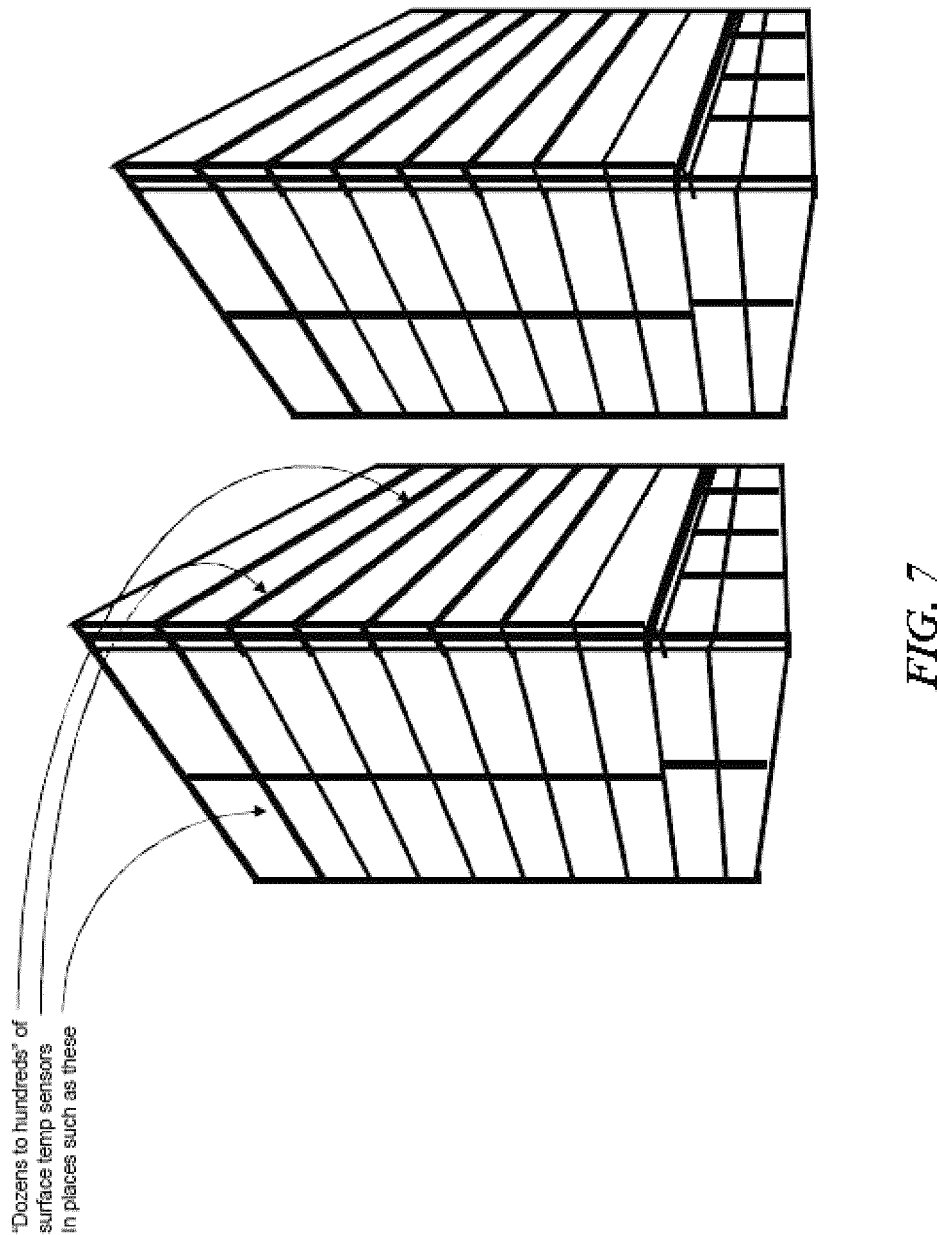
FIG. 7 depicts an exemplary arrangement wherein surface temperature sensors are placed on the exterior of a building for building surface measurement as provided for by the invention.

FIG. 7 depicts an exemplary arrangement wherein surface temperature sensors are placed on the exterior of a building for building surface measurement as provided for by the invention. The invention provides for other sensors in such positions as well as can be advantageous. Networking can be provided by multi-tap electrical buses and/or one or more multiple-access wireless network(s).

Figure 8:
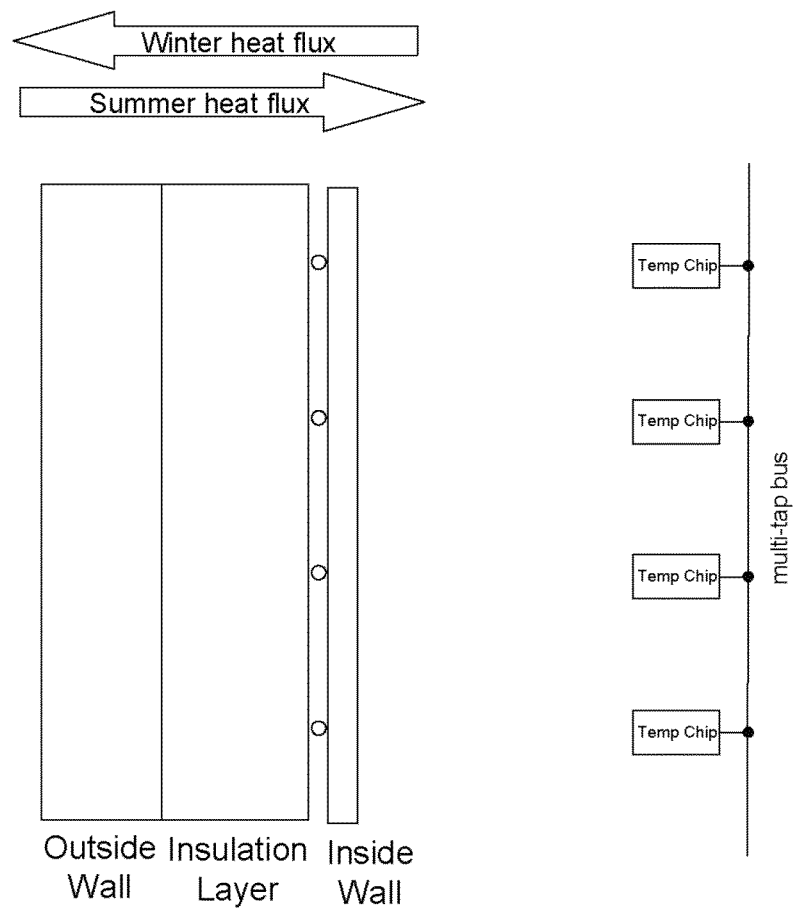

FIG. 8a depicts a cross-section view of a part of wall that is comprised of outside wall, inside wall, and insulation layer in between wherein one or more temperature sensors are placed in the gap between the insulation layer and inside wall. The arrows indicate exemplary possible seasonal directions of heat flux.

FIG. 8b depicts an exemplary multi-tap electrical bus arrangement for connecting a plurality of temperature sensors in an arrangement such as that depicted in FIG. 8a. In an embodiment, the aforedescribed multi-tap electrical bus can be replaced and/or supplemented by one or more multiple-access wireless network(s) and/or cabled Ethernet™.

External Environment Sensors

Figure 9:
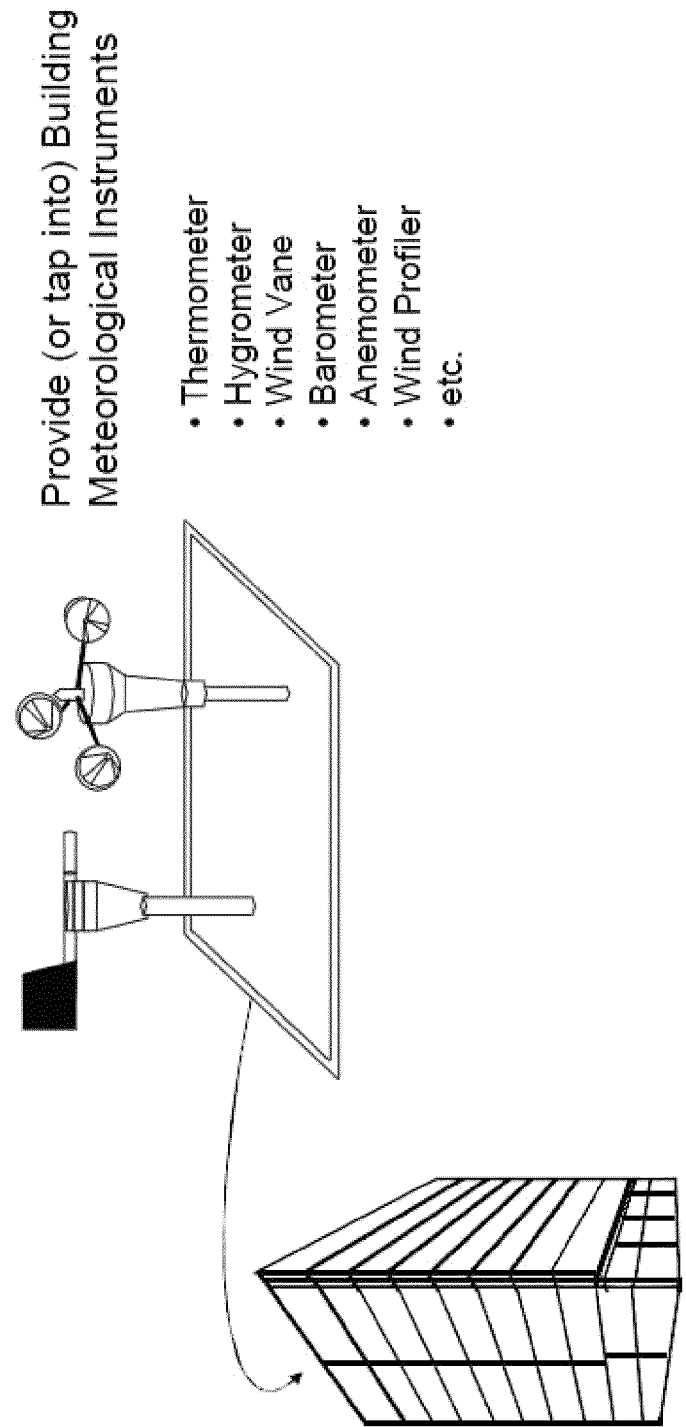
FIG. 9 depicts an exemplary arrangement for external environment measurements.

FIG. 9 depicts an exemplary roof region arrangement for external environment measurements for providing measurement data to the information system. In an embodiment, the invention includes data feeds from one or more electronic meteorological instruments attached to, or in the immediate vicinity of the building(s). Exemplary electronic meteorological instruments can include:
Thermometer,
Barometer,
Hygrometer,
Anemometer,
Wind Vane,
Wind Profiler.

Additionally, the roof region or other advantageous regions can be outfitted with spatially-distributed sensors for measuring heat-flux in or out of the building, local surface temperature, surface moisture, accumulated standing water, accumulated dust/dirt, reflected light, etc.

The sensors can be networked with the same, difference, or alternate networking arrangements, including one or more of multi-tap electrical bus arrangements, wireless networking and/or cabled Ethernet™.

Statistical Processing, Analysis, Modeling Simulation, and Decision Support

The invention provides for the inclusion of one or more of statistical processing software, analysis software, modeling software, simulation software, and Decision Support software. In general, the invention provides for implementations to permit as advantageous information flows and exchanges among any two or more of:
Real-time measurement data,
Stored measurement data,
Statistical processing software,
Analysis software,
Modeling software,
Simulation software, Decision support software,
External systems (including building systems),
System-internal databases,
Building-internal databases,
Campus databases,
Cloud-based databases,
Outside networks.

Figure 11A:
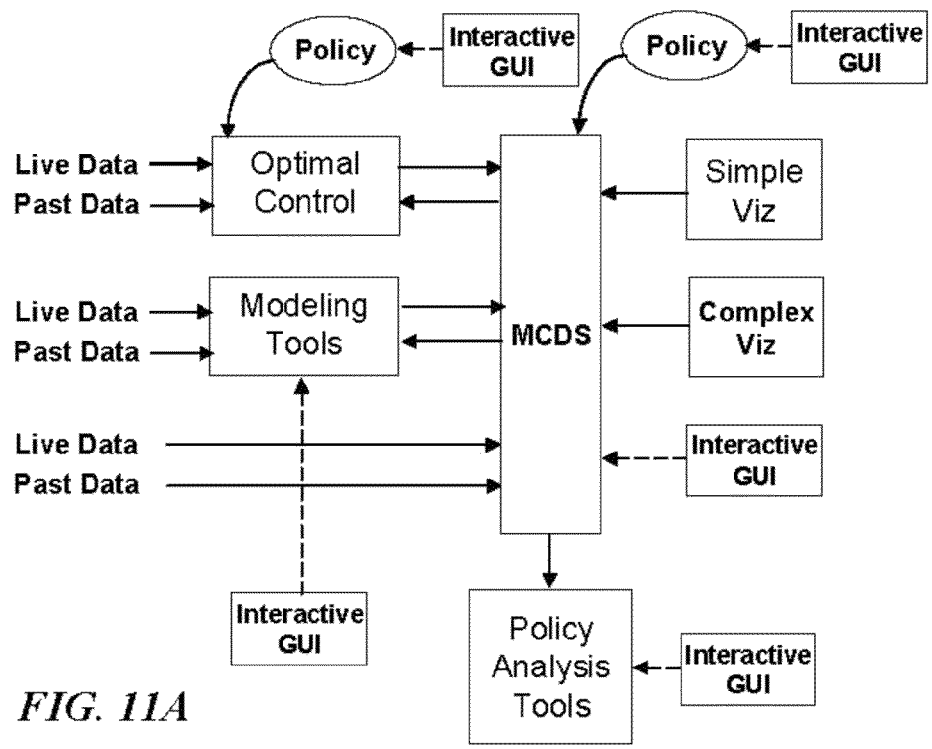
FIG. 11 depicts an exemplary arrangement and data flow among Multi-Criteria Decision Support tools, optimal control prototyping, modeling tools, and data analysis as provided for by the invention.
Figure 11B:
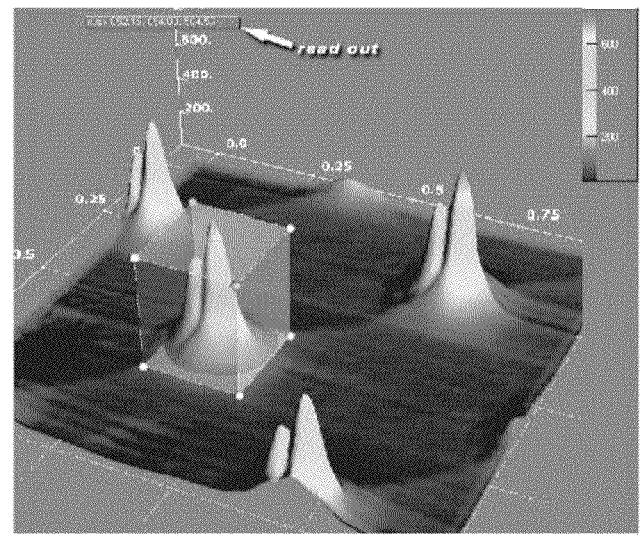

FIG. 10 depicts an example of a display and operations console as provided for by the invention. This example of a display and operations console will be considered in more detail in a later section: FIG. 11 depicts one of a wide range of example arrangements and data flows among Multi-Criteria decision support tools, modeling tools, optimal control prototyping tool(s), and policy analysis tool(s) as provided for by the invention. As mentioned above, statistical processing, analysis, and/or simulation tools (not shown in FIG. 11) can be provided.

Models can comprise one or more of:
Statistically-determined empirical models,
Abstract analytical models.
Other forms and/or types of models.
Some implementations can permit two or more such systems to work together or parallel, series, iterative arrangements, and/or as part of a large arrangement. Models can comprise one or more of:
Air flow models,
Energy usage models,
Energy systems models,
Heat-transport models,
Heat-flux propagation models,
Air quality models,
Human health models,
Other forms and/or types of models.

Some implementations can permit two or more such systems to work together or parallel, series, iterative arrangements, and/or as part of a large arrangement.

Decision support tools can comprise one or more of:
Statistical hypothesis testing,
Utility-function calculation,
Utility-function and/or performance-metric optimization,
Multi-Criteria Decision Support (MCDS) tools
Other forms and/or types of Decision support tools.
Some implementations can permit two or more such systems to work together or parallel, series, iterative arrangements, and/or as part of a large arrangement.

In the exemplary arrangement of FIG. 11, one or more of live data, stored past data, can be presented to one or more of Multi-Criteria Decision Support tool(s), modeling tool(s), optimal control prototyping tool(s). In an embodiment, one or more of live data, stored data, Multi-Criteria Decision Support tool output, model tool output, and optical control output can be presented to data analysis tools (not shown in FIG. 11). In the exemplary arrangement of FIG. 11, one or more of the Multi-Criteria Decision Support tool(s), model tool(s), and optical control tool(s) exchange outputs to serve as input information. In the exemplary arrangement of FIG. 11, one or more optimization policies are provided to the optimal control tool(s) under the control of an interactive graphical user interface. In the exemplary arrangement of FIG. 11, one or more decision policies are provided to the Multi-Criteria Decision Support tool(s) under the control of an interactive graphical user interface. In the exemplary arrangement of FIG. 11, the output from the Multi-Criteria Decision Support tool(s) are directed to a policy analysis tool under the control of an interactive graphical user interface. Many other variations in configuration, constituent elements, and data flows are possible as is now clear to one skilled in the art and are accordingly provided for by the invention.

Although not showed in FIG. 11, the invention provides for storage and recall of the output of one or more of statistical processing software, modeling software, analysis software, simulation software, and decision-support software. These stored outputs can be searched, selectively retrieved, reviewed, presented, combined or compared with one another, live or past measurement data, and/our other output from one or more of statistical processing software, modeling software, analysis software, simulation software, and decision-support software. The aforementioned present, combine, and compare operations can include information visualization (for example as described below) and/or further processing by one or more of statistical processing software, modeling software, analysis software, simulation software, and decision-support software.

Display and Operations Console

FIG. 10 depicts an exemplary display and operations console as provided for by the invention. In an embodiment, the display and operations console can provide one or more of (although not limited to):
Visualizations (simple and/or complex) of:
 Real-time measurement data,
 Past measurement data,
 Analysis tool(s) and results,
Optimal control suggestion tool(s) (for suggesting one or more operation strategies—optimized with respect to a provided policy—which can be analyzed for value and performance,
Multi-Criteria Decision Support (MCDS) tool(s) and results,
Policy research tool(s),
Mock-up operations GUI (for analysis, training, etc.),
Actual operations GUI (for information system and/or building system operation),
Warnings to indicate trends or conditions of concern,
Alarms to indicate conditions or trends of special concern.

It is to be understood that there are a wide range of possible implementations for a display and operations console or its equivalent. Accordingly, the example exemplary display and operations console is merely an example an by no means limiting.

As an example alternative, the display and operations console can be rendered as windows in a web-hosted application accessible over an IP network. The IP network can be an internal network, a dedicated network, a VPN, or the internet.

Information Visualization

Information visualization providing various levels of complexity provides important tools to building operators, building system designers, and researchers. In an embodiment, the invention provides for information visualization capabilities to be implemented in the Display and Operations Console.

In an embodiment, the invention provides for information visualization capabilities to be implemented and/or provided via internet (web) access.

In an embodiment, combinations of collected data from different type of sensors can be combined and/or presented by information visualization tools into meaningful representations readily understandable and usable by operators, researchers, designers, and decision makers.

In an embodiment, combinations of collected data from different type of information sources (for example, one or more of sensors, statistical software, analysis software, modeling software, simulation software, decision support software, databases, information feeds, interfaces with building systems, information with external weather information systems, etc.) can be combined and/or presented by information visualization tools into meaningful representations readily understandable and usable by operators, researchers, designers, and decision makers.

In an implementation, information visualization can comprise plots of real-time measurement data. In an implementation, information visualization can comprise plots of statistically processed information. In an implementation, information visualization can comprise plots of analysis information. In an implementation, information visualization can comprise plots of model information. In an implementation, information visualization can comprise plots of simulation information. In an implementation, information visualization can comprise plots of decision support information.

In an implementation, information visualization can comprise one or more multi-color plots. In an implementation, information visualization can comprise one or more 2D plots. In an implementation, information visualization can comprise one or more 3D plots.

More broadly, information visualization capabilities provided for by the invention can comprise one or more of (but is not limited to):
Simple data graphs,
Simple 3D information visualization renderings of surfaces, scatter plots, etc.,
Complex 3D information visualization renderings of surfaces, transparent volumes, etc.,
Composites of two or more 2D and/or 3D information visualization renderings,
Dense information representations,
Overlays of information from multiple data sources such as (but not limited to):
  Live information visualization,
  Past information visualization,
  Model visualization,
  Analysis visualization
  Decision support visualization.

In an embodiment, the invention provides for information visualizations of a particular information set to be interactive, for example including (but not limited to) viewpoint changes, zoom features, color changes, information exclusions, scale changes, etc.

Incremental Deployment and Evolution

The present invention address the aforementioned forces and concerns with an entirely elective, entirely private, incrementally deployed, incrementally modifiable, relatively inexpensive building information system that provides for a range of energy and environmental capabilities including
Room environment sensing arrangements,
Building environment sensing arrangements,
Statistical processing software,
Modeling software,
Analysis software,
Visualization software,
Data logging arrangements,
Data storage and recall arrangements,
Control arrangements,
Interfacing arrangements with existing building systems (HVAC, solar, valves, power systems, etc.).
Interfacing arrangements with external information systems and networks.

The invention provides for an open architecture facilitating the incremental introduction, expansion, conversion, replacement, and interfacing of the various component hardware and/or software systems and methods.

The invention can be used in various ways, either as dedicated to one or more specific purpose(s) or evolving incrementally through a sequence of developmental and/or application stages over a period of time. Example purposes and stages include:
Trial deployment of various sensors, networks, systems, and software
Early exploratory information gathering
Focused specific-purpose information gathering
Analysis of current, past, or ongoing energy usage
Analysis of current, past, or ongoing energy loss and/or waste
Analysis of building and facilities changes on energy usage, loss and/or waste
Analysis of policy and operating procedure changes on energy usage, loss
Analysis of current, past, or ongoing air temperature distributions,
Analysis of building and facilities changes on air temperature distributions,
Analysis of policy and operating procedure changes on air temperature distributions,
Analysis of current, past, or ongoing air quality (humidity, impurities, oxygen, carbon dioxide),
Analysis of building and facilities changes on air quality,
Analysis of policy and operating procedure changes on air quality,
Modeling of impacts of potential changes to building and facilities,
Modeling of impacts of potential changes to policy and operating procedure,
Simulation of impacts of potential changes to building and facilities.
Simulation of impacts of potential changes to policy and operating procedure changes,
Decision support for potential changes to building and facilities,
Decision support for potential changes to policy and operating procedure changes
Design of optimal control policies for building air system operation,
Design of optimal control policies for building energy system operation.

Figure 12A:
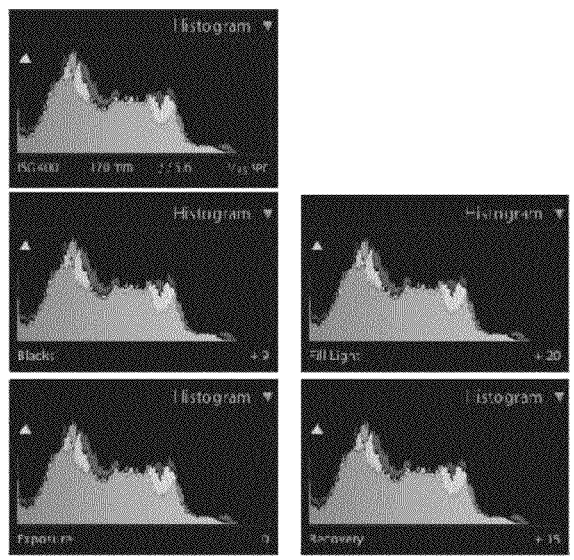
FIG. 12 depicts an example sequence of implementations evolving incrementally through a sequence of developmental and/or application stages over a period of time.
Figure 12B:
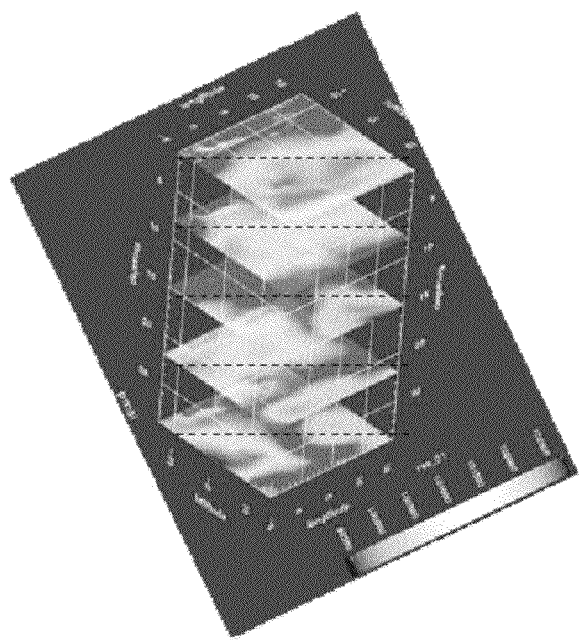
Figure 12C:
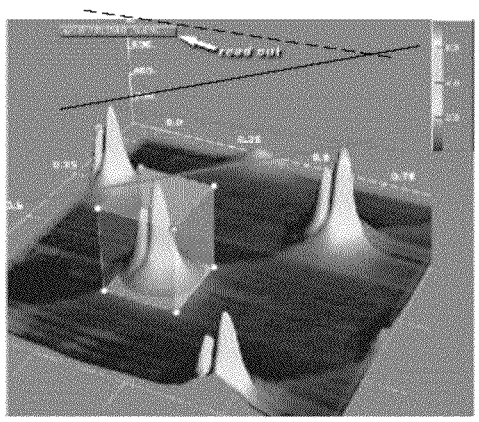

FIG. 12 depicts an example sequence of implementations evolving incrementally through a sequence of developmental and/or application stages over a period of time.

The aforementioned, as well as other variations, can be implemented as an algorithm on a digital computer, embedded processor, signal processor, or combination of two or more of these.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While the invention has been described in detail with reference to disclosed embodiments, various modifications within the scope of the invention will be apparent to those of ordinary skill in this technological field. It is to be appreciated that features described with respect to one embodiment typically can be applied to other embodiments.

The invention can be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Although exemplary embodiments have been provided in detail, various changes, substitutions and alternations could be made thereto without departing from spirit and scope of the disclosed subject matter as defined by the appended claims. Variations described for the embodiments may be realized in any combination desirable for each particular application. Thus particular limitations and embodiment enhancements described herein, which may have particular advantages to a particular application, need not be used for all applications. Also, not all limitations need be implemented in methods, systems, and apparatuses including one or more concepts described with relation to the provided embodiments. Therefore, the invention properly is to be construed with reference to the claims.

I claim:

1. A building information system, the building information system comprising:
   at least a first plurality of sensors distributed within the interior of a building;
   at least a second plurality of sensors on the exterior of the building;
   data receiving software for receiving measurement data produced by the first plurality of sensors and the second plurality of sensors over a network;
   at least one statistical processing software system configured to produce statistically processed information from measurement data provided by the data receiving software;
   at least one analysis software system configured to produce analysis information from measurement data provided by the data receiving software;
   at least one software model to produce model data from measurement data provided by the data receiving software;
   at least one decision support software system configured to support and assist decision-making activities and to produce decision support information from measurement data provided by the data receiving software;
   at least one database for storing the produced statistically processed information, analysis information, model data and decision support information;
   at least one information visualization system to generate one or more 3D plots by combining the stored statistically processed information, analysis information, model data and decision support information in the at least one database and present the generated one or more 3D plots to a user.

2. The building information system of claim 1, the system further comprising a simulation system.

3. The building information system of claim 1, wherein the decision support software system is a multiple criterion decision support system.

4. The building information system of claim 1, wherein the at least one of the statistical processing software system, the analysis software system, the software model, the decision support software system provides information to the database.

5. The building information system of claim 1, wherein at least one of the statistical processing software system, the analysis software system, the software model, the decision support software system is provided information from the database.

6. The building information system of claim 1, wherein the at least one information visualization system displays information from at least two of the statistical processing software system, the analysis software system, the software model, the decision support software system.

7. The building information system of claim 1, wherein the first plurality of sensors includes sensors for the measurement of electrical power usage in a room.

8. The building information system of claim 1, wherein the first plurality of sensors includes sensors for the measurement of the temperature in at least one part of a room.

9. The building information system of claim 1, wherein the second plurality of sensors includes sensors for the measurement of the heat flux flowing between the interior of the building and the environment outside of the building.

10. The building information system of claim 1, wherein the second plurality of sensors includes sensors for the measurement of the temperature of at least one location on the exterior of the building.

11. The building information system of claim 1, wherein the at least one decision support software system is configured to facilitate at least one of Statistical hypothesis testing, Utility-function calculation, Utility-function optimization, performance-metric optimization, and Multi-Criteria Decision Support.

12. The building information system of claim 1, wherein the at least one software model comprises at least one of: Statistically-determined empirical models, abstract analytical models, Air flow models, Energy usage models, Energy systems models, Heat-transport models, Heat-flux propagation models, Air quality models, and Human health models.

13. A method for implementing a building information system, the method comprising:
    at least a first plurality of sensors distributed within the interior of a building;
    at least a second plurality of sensors on the exterior of the building;
    receiving measurement data produced by the first plurality of sensors and the second plurality of sensors over a network by data receiving software;
    producing, by at least one statistical processing software system, statistically processed information from the received measurement data;
    producing, by at least one analysis software system, analysis information from the received measurement data;
    producing, by at least one software model, model data from the received measurement data;
    supporting and assisting decision-making activities and producing decision support information, by at least one decision support software system, from the received measurement data;
    storing the produced statistically processed information, analysis information, model data and decision support information in at least one database;
    generating, by at least one information visualization system, one or more 3D plots by combining the stored statistically processed information, analysis information, model data and decision support information in the at least one database and presenting the generated one or more 3D plots to a user.

14. The method of claim 13, the method further comprising a simulation system.

15. The method of claim 13, wherein the at least one decision support software system is a multiple criterion decision support system.

16. The method of claim 13, wherein the at least one of the statistical processing software system, the analysis software system, the software model, the decision support software system provides information to the database.

17. The method of claim 13, wherein at least one of the statistical processing software system, the analysis software system, the software model, the decision support software system is provided information from the database.

18. The method of claim 13, wherein the information visualization system displays information from at least two of the statistical processing software system, the analysis software system, the software model, the decision support software system.

19. The method of claim 13, wherein the first plurality of sensors includes sensors for the measurement of electrical power usage in a room.

20. The method of claim 13, wherein the first plurality of sensors includes sensors for the measurement of the temperature in at least one part of a room.

21. The method of claim 13, wherein the second plurality of sensors includes sensors for the measurement of the heat flux flowing between the interior of the building and the environment outside of the building.

22. The method of claim 13, wherein the second plurality of sensors includes sensors for the measurement of the temperature of at least one location on the exterior of the building.

23. The method of claim 13, wherein the at least one decision support software system facilitates at least one of statistical hypothesis testing, Utility-function calculation, Utility-function optimization, performance-metric optimization, and Multi-Criteria Decision Support.

24. The method of claim 13, wherein the at least one software model comprises at least one of: a Statistically-determined empirical model, an abstract analytical model, an Air flow model, an Energy usage model, an Energy systems model, a Heat-transport model, a Heat-flux propagation model, an Air quality model, and a Human health model.

* * * * *